(12) United States Patent
Smith et al.

(10) Patent No.: US 8,306,669 B1
(45) Date of Patent: Nov. 6, 2012

(54) METHOD FOR OPERATING A THERMOSTATICALLY CONTROLLED HEATER/COOLER WITH FRESH AIR INTAKE

(75) Inventors: Blaine M. Smith, Portland, OR (US); Matthew T. Fisher, Reno, NV (US)

(73) Assignee: Tim Simon, Inc., San Francisco, CA (US)

(*) Notice: Subject to any disclaimer, the term of this patent is extended or adjusted under 35 U.S.C. 154(b) by 286 days.

(21) Appl. No.: 12/610,076

(22) Filed: Oct. 30, 2009

(51) Int. Cl.
*G05D 11/00* (2006.01)

(52) U.S. Cl. ........ 700/286; 700/153; 700/202; 700/205; 700/276

(58) Field of Classification Search .................. 700/153, 700/202, 205, 276, 286
See application file for complete search history.

(56) References Cited

U.S. PATENT DOCUMENTS

| | | | |
|---|---|---|---|
| 2,372,839 A | 4/1945 | McGrath | |
| 2,801,825 A | 8/1957 | Bishofberger | |
| 4,018,266 A | 4/1977 | Kay | |
| 4,410,131 A | 10/1983 | Radtke et al. | |
| 5,467,745 A * | 11/1995 | Hollis | 123/41.1 |
| 5,634,346 A * | 6/1997 | Ramakrishnan et al. | 62/89 |
| 5,669,335 A * | 9/1997 | Hollis | 123/41.1 |
| 6,385,510 B1 * | 5/2002 | Hoog et al. | 700/276 |
| 6,491,094 B2 * | 12/2002 | Rayburn et al. | 165/250 |
| 6,650,249 B2 | 11/2003 | Meyer et al. | |
| 6,671,586 B2 | 12/2003 | Davis et al. | |
| 6,824,069 B2 * | 11/2004 | Rosen | 236/94 |
| 7,028,912 B1 * | 4/2006 | Rosen | 236/1 C |
| 7,152,806 B1 * | 12/2006 | Rosen | 236/94 |
| 7,156,318 B1 * | 1/2007 | Rosen | 236/94 |
| 7,302,642 B2 * | 11/2007 | Smith et al. | 715/702 |
| 7,331,187 B2 * | 2/2008 | Kates | 62/129 |
| 2005/0098639 A1 * | 5/2005 | DeLuca | 236/46 R |
| 2005/0125102 A1 * | 6/2005 | Nichols et al. | 700/276 |
| 2006/0186214 A1 * | 8/2006 | Simon et al. | 236/1 C |
| 2008/0185451 A1 * | 8/2008 | Simon et al. | 236/51 |
| 2008/0223051 A1 * | 9/2008 | Kates | 62/129 |
| 2010/0095695 A1 * | 4/2010 | Halaka | 62/255 |
| 2010/0102948 A1 * | 4/2010 | Grohman et al. | 340/506 |
| 2010/0106318 A1 * | 4/2010 | Grohman et al. | 700/276 |

FOREIGN PATENT DOCUMENTS

WO 0212796 A2 2/2002

OTHER PUBLICATIONS

RobertshawO, 9915i Deluxe Programmable Thermostat Product Sheet, Sep. 2004, 2 pages.

* cited by examiner

*Primary Examiner* — Mohammad Ali
*Assistant Examiner* — Anthony Whittington
(74) *Attorney, Agent, or Firm* — James F. Hann; Haynes Beffel & Wolfeld LLP (57) ABSTRACT

A thermostat-controlled heater/cooler is used to condition air in a temperature-controlled region. A target temperature is obtained and compared to the temperature of the region to determine if heating/cooling is required. If yes, then outside air is directed into the region without operating heater/cooler and updated temperatures of the region are measured. The directing and measuring are continued until (1) the measured temperature equals the target temperature, at which time control returns to the obtaining a target temperature step, or (2) the updated measured temperature differs from the target temperature by a chosen amount, and in some examples, if the updated temperature does not reach the target temperature within a chosen length of time, or the target temperature changes, or the program segment ends, at which time directing outside air into the temperature-controlled region is stopped and the heater/cooler is operated under control of the thermostat.

13 Claims, 5 Drawing Sheets

METHOD FOR OPERATING A THERMOSTATICALLY CONTROLLED HEATER/COOLER WITH FRESH AIR INTAKE

BACKGROUND OF THE INVENTION

The present invention relates generally to thermostats used to control heating and cooling systems, such as gas or electric forced air furnaces, gas or electric radiant heating furnaces, electric forced air air-conditioning systems, and electric heat pumps. Invention may also be suitable for other types of systems, including solar and solar electric heating and cooling systems. While many systems provide both heating and cooling, the invention is suitable for use with systems that provide heating or cooling or both heating and cooling, often collectively referred to as a heater/cooler.

Programmable thermostats typically use a screen, such as a liquid-crystal display (LCD), to display both operational functions and programming values. The user enters commands into the thermostat, such as for setting the current time and date and programming the thermostat, by pressing keys or pressing appropriate positions on a touch screen display. Programming conventional thermostats is often accomplished by selecting a series of different screens on the display. In addition to making entries using a touch screen display, thermostat often include additional button type inputs.

High energy efficiency of buildings is often achieved in part by substantially reducing air infiltration into the building. One of the drawbacks of such tightly constructed buildings is that the air inside the building can become stale and often permits buildup of harmful or at least objectionable components in the air. The advantages that can be achieved by using controlled amounts of ambient, outside air to reduce these air quality problems when heating or cooling the building are well known. Some conventional systems cycle the air in the building or permit outside air to be introduced into the building at periodic intervals, such as for five minutes every hour, or by a special air purge cycle, typically when the building is not occupied. Other conventional system may permit the heater/cooler to incorporate a chosen percentage of outside air into the air being heated or cooled. See, for example, U.S. Pat. Nos. 2,372,839; 4,018,266; and 6,491,094. An exemplary thermostat is the Robertshaw model 9914i made by Invensys Controls of Carol Stream, Ill.

BRIEF SUMMARY OF THE INVENTION

One aspect of the invention is the recognition that it may be possible to use ambient air as is, that is without heating or cooling it, as the first stage of heating or cooling the inside of a building or other temperature-controlled region. Doing so provides the dual advantage of providing fresh, outside air into the building without the need to use energy to heat or cool the air. For example, in some regions of the country daytime temperatures can be quite high, such as 95° F., but after sunset the outside temperature cools off quite quickly, such as to 70° F. while the temperature of the house has been maintained at 78° F. by the heater/cooler. Thus, the present invention takes advantage of this and provides for a first heating/cooling stage that uses outside air to, in this example, cool the building. Similarly, in some situations the outside air, typically air adjacent to a building and, in particular, adjacent to a south facing wall of the building, can be sufficiently heated by the sun to enable it to be used to heat the inside of the building, or other temperature-controlled region, without the need to use energy to heat the air.

In one example, the invention is directed to a method for operating a heater/cooler controlled by a thermostat. The heater/cooler is operable to condition air in a temperature-controlled region within an ambient environment of outside air. A target temperature is obtained. The temperature of a temperature-controlled region is measured by a thermostat with the thermostat operating according to a program segment. The target temperature and the measured temperature are compared to obtain an Initial Temperature Difference between said temperatures. Whether or not heating/cooling is required is determined based upon said Initial Temperature Difference. If heating/cooling is required, then proceed as follows. Direct outside air from the ambient environment into the temperature-controlled region without using the heater/cooler to change the temperature of the outside air. At least periodically measure the temperature of the temperature-controlled region to obtain an updated measured temperature. The directing and measuring steps are continued until (1) the measured temperature equals the target temperature, at which time control returns to the obtaining a target temperature step, or (2) the updated measured temperature differs from the target temperature by a chosen amount, at which time directing outside air into the temperature-controlled region is stopped and the heater/cooler is operated under control of the thermostat.

In some examples, the directing and measuring steps are continued until (1) the measured temperature equals the target temperature, at which time control is returned to the obtaining a target temperature step, or (2) any one of the following occurs, at which time outside air is stopped being directed into the temperature-controlled region and the heater/cooler is operated under control of the thermostat: the updated measured temperature differs from the target temperature by a chosen amount; or the updated temperature does not reach the target temperature within a chosen length of time; or the target temperature changes; or the program segment ends.

In some examples, if heating/cooling is required, then, before the direct outside air step, the temperature of the outside air is sensed. If the temperature of the outside air is at least X° above the target temperature when in a heating mode or is at least Y° below the target temperature in the cooling mode, then proceed with the direct outside air step. If the temperature of the outside air is not at least X° above the target temperature when in a heating mode or is not at least Y° below the target temperature in the cooling mode, then operate the heater/cooler under control of the thermostat.

In another example, the invention is also directed to a method for operating a heater/cooler controlled by a thermostat. The heater/cooler is operable to condition air within a temperature-controlled region. The temperature-controlled region is within an ambient environment of outside air. A selection is made between a fan on mode and a fan auto mode. A circulate mode is selected or not selected. If the fan on mode is selected, then outside air from the ambient environment is directed into the temperature-controlled region whether or not the heater/cooler is operating to change the temperature of the air within the temperature-controlled region. If the fan auto mode is selected and the circulate mode is not selected, then outside air from the ambient environment is directed into the temperature-controlled region when the heater/cooler is operating to change the temperature of the air within the temperature-controlled region. If the fan auto mode is selected and the circulate mode is selected, then outside air from the ambient environment is directed into the temperature-controlled region: (1) when the heater/cooler is operating to change the temperature of the air within a temperature-controlled region, and (2) for a minimum length of time per time period.

Various features and advantages of the invention will appear from the following description in which the preferred embodiments have been set forth in detail in conjunction with the accompanying drawings.

DETAILED DESCRIPTION OF THE INVENTION

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

Figure 1:
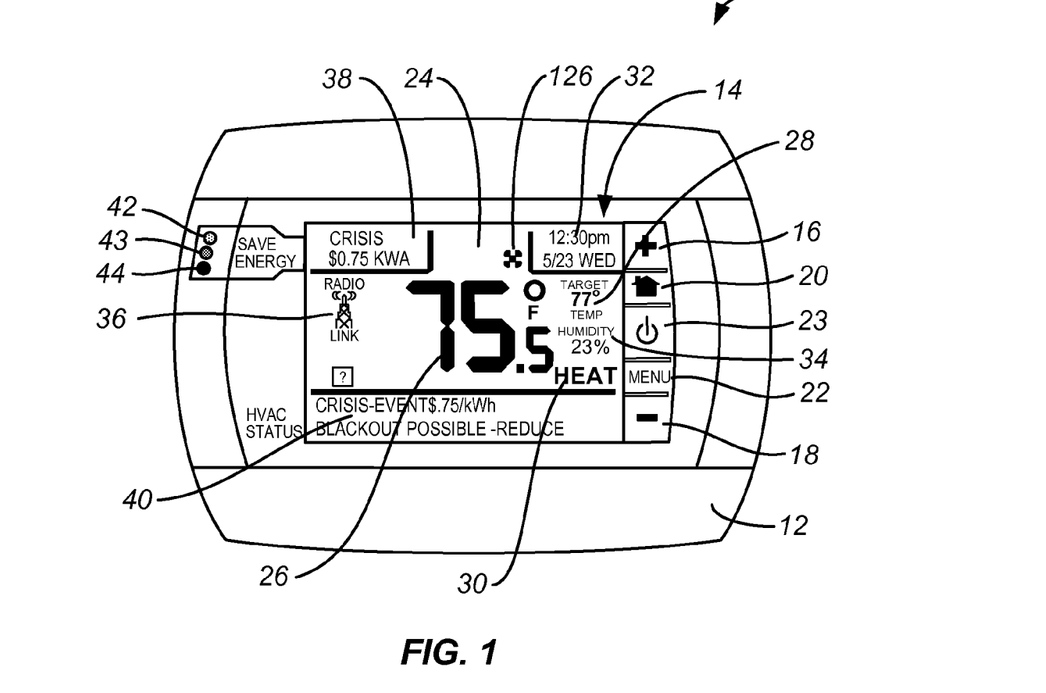
FIG. 1 is a front view of an example of a thermostat made according to the invention with the display showing a home screen.

FIG. 1 illustrates one example of a thermostat 10 made according to the invention. Thermostat 10 includes a body or housing 12 containing a touch screen display 14. Thermostat 10 also includes an increase or up input 16 and a decrease or down input 18 adjacent to display 14. Thermostat 10 also includes a home input 20, a menu input 22 and a power/mode input 23. Inputs 16, 18, 20, 22 and 23 are, in this example, button type inputs although other type of inputs could also be used. Touching home input 20 returns display 14 to a home screen 24, an example of which is shown in FIG. 1. In this example, home screen 24 displays the current temperature 26, a target temperature 28, and a HEAT/COOL/AUTO/OFF mode indicator 30. Other information can also be provided, such as at a date and time indicator 32, humidity indicator 34, radio link indicator 36 and alphanumeric power alert indicators 38, 40. When the existence or warning of a power alert has been transmitted to thermostat 10, such as through a radio link, information regarding the energy crisis is provided at alphanumeric energy alert indicators 38, 40 and green, yellow and red status lights 42, 43, 44. The various features described above can be of conventional or unconventional design. Examples of thermostats are disclosed in US patent application publication number US-2006-0186214-A1 published 24 Aug. 2006 and in U.S. Pat. No. 6,824,069 issued 30 Nov. 2004, the disclosures of which are incorporated by reference.

Examples of power alert type of systems are shown in U.S. Pat. Nos. 6,671,586 issued 30 Dec. 2003 and 6,650,249 issued 18 Nov. 2003 and in US patent application publication US 2008/0185451 published 7 Aug. 2008, the disclosures of which are incorporated by reference.

Thermostat 10 is preferably a programmable thermostat which allows the user to change the operating temperature over the course of the day and typically allowed each day to be programmed differently. For example, assume the thermostat is in a heating mode, a typical programmed heat profile includes the following program segments: 62° F. from midnight to 6 AM; 70° F. from 6 AM to 8:30 AM; 64° F. from 8:30 AM to 4 PM; 68° F. from 4 PM to 10 PM; and 62° F. from 10 PM to midnight. The higher heating mode temperatures, 68° F. and 70° F. in this example, are typically called target temperatures or target operating temperatures while the lower heating mode temperatures, 62° F. and 64° F., are typically called the setback temperatures or setback operating temperatures.

One problem with conventional programmable thermostats arises when a user wishes to change the operating temperature without having to reprogram the thermostat. For example, assume the user gets up earlier than usual and leaves at 7 AM. There is typically no convenient way to permit the user to move the current operating temperature from the morning target temperature of 70° F. to the associated setback temperature of 64° F. Note that the associated setback temperature is typically the setback temperature following the current target temperature and the associated target temperature is the target temperature following the current setback temperature. To help address this problem, in one example, thermostat 10 comprises a save energy input 45 which allows a user to toggle the operating temperature of the thermostat between the current target temperature and the associated, that is the next, setback temperature by simply pressing save energy input 45. Thus, in this example, the user can simply press save energy input 45 at 7 AM causing the operating temperature change from 70° F. to the associated setback temperature of 64° F. at 7 AM instead of 8:30 AM. Similarly, if the user arrives early at, for example, 2:30 PM, simply pressing save energy button 45 causes the operating temperature to change from the current setback temperature of 64° F. to the associated operating temperature of 68° F.

In another example, save energy input 45 operates as follows. By pressing save energy button 45, the target temperature for the current program cycle will be changed, increased in cooling mode and decreased in heating mode, by a preset offset, typically from 1° F. through 9° F. The amount being changed will be visible on display 14, such as "Save Energy A 4°." This offset can be adjusted using the up and down inputs 16, 18. This save energy feature can also be remotely controlled, such as by a radio signal from the power company during a power crisis. An example of such a system is shown in patent publication US 2008/0185451, the disclosure of which is incorporated by reference. Note that in some power crisis systems, the power company can determine the amount of the offset, which may be different from a user selected or hardware manufacturer selected offset.

Figure 2:
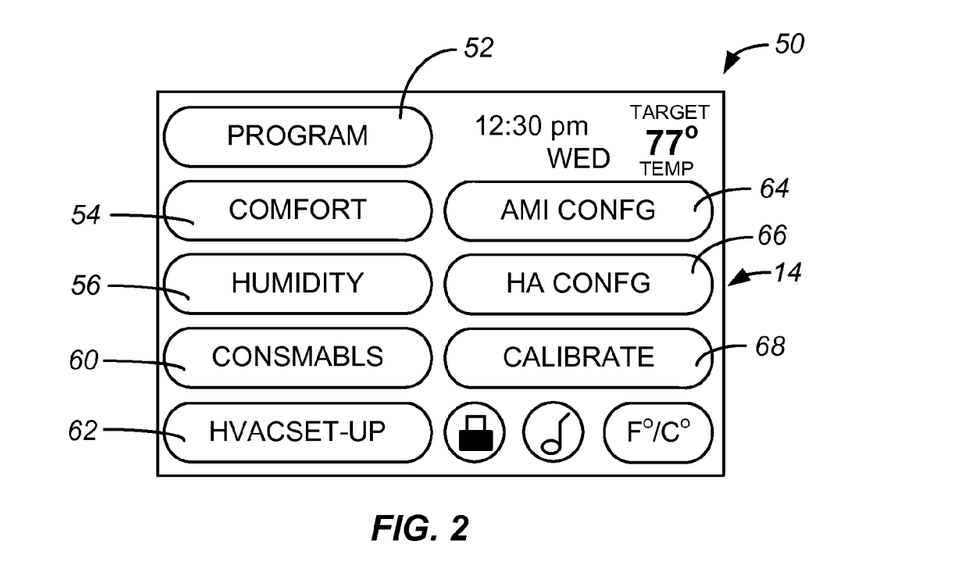
FIG. 2 shows a menu screen of the thermostat of FIG. 1 displayed after pressing the menu input of the thermostat of FIG. 1.

FIG. 2 illustrates a menu screen 50 which is shown on display 14 when menu input 22 is pressed. Pressing PROGRAM input 52 causes a program screen to be shown on display 14. The program screen is used to set a daily time/temperature schedule when in the heat or cool modes. COMFORT input 54 is used to maintain an appropriate temperature level consistent with a desired level of efficiency. HUMIDITY input 56 is used to select minimum and maximum humidities when the heating/cooling system 58, shown in FIG. 4, includes a humidifier. CONSUMABLES input 60 allows the user to monitor the remaining life for parts of the system, such as air filters, humidifier pads and ultraviolet bulbs, that have limited lives and need periodic replacement. HVAC SET-UP input 62 is used to configure thermostat 10 to control the heating cooling system 58. AMI CONFIGURATION input 64 is used to configure power company network connections when the system can be under partial control of the power company during, for example, a heat wave creating the need to reduce power consumption. See, for example, US patent application publication US 2008/0185451 published 7 Aug. 2008. HOME AUTOMATION CONFIGURATION input 66 is used when configuring home automation network connections. CALIBRATE input 68 is used to allow the user to change the value of the displayed current temperature 26 to, for example, the current display temperature of another thermostat. For purposes of this invention, what is important are the home screen of FIG. 1 and the manual screen of FIG. 3 so that the other inputs and screens associated with menu screen 50 will not be described in detail.

Figure 3:
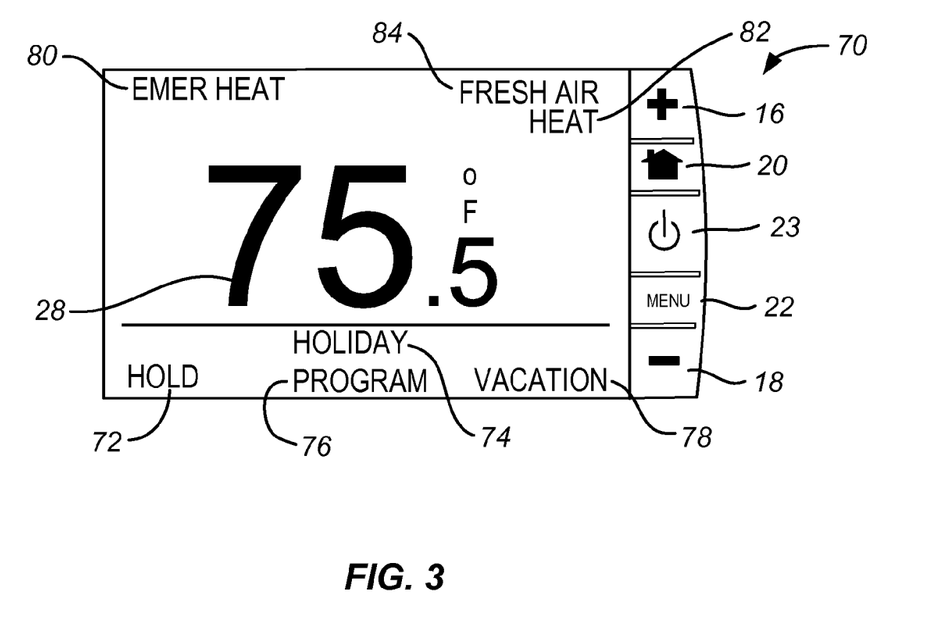
FIG. 3 shows a manual screen of the thermostat of FIG. 1 displayed after pressing the + or − buttons or the current temperature on the home screen of FIG. 1.

Manual screen 70, shown in FIG. 3, is accessed from home screen 24 when power/mode input 23 has been placed in heat or cool modes by either pressing up input 16, down input 18 or current temperature 26. Thermostat 10 could, of course, the design to permit access to manual screen 70 in other ways. The current target temperature 28 can be temporarily changed from manual screen 70 by using up and down inputs 16, 18. Doing so will cause the target temperature to be temporarily changed for the current program segment of thermostat 10. When a new program segment begins, the program's target temperature for that segment becomes active. Note that the target temperature for the program segment just before midnight is typically the same as the target temperature for the program segment just after midnight. Also, note that in this example, in manual screen 70, current temperature 26 shown on the home screen 24 is not visible. Pressing HOLD 72 allows the current target temperature to be changed from the present program's target temperature to any other temperature, to be used indefinitely, that is during the current program segment and all future program segments, until HOLD 72 is pressed again. Pressing HOLIDAY 74 activates a preset holiday program while pressing PROGRAM 76, located just below HOLIDAY 74, allows the user to set up a holiday program. A holiday program is a single program that repeats day after day until turned off. It supersedes any weekly program. Pressing VACATION 78 immediately changes the target temperature from the program to target temperature to a preset, so-called vacation target temperature that the user can select, to be used indefinitely, that is during the current program segment and all future program segments until VACATION 78 is pressed again. Therefore, the basic difference between HOLD and VACATION is that with HOLD the user must select the temperature to be used while with VACATION the temperature used is preprogrammed, typically by the user. EMERGENCY HEAT 80 is, in this example, displayed only when system 58 includes a heat pump and an auxiliary heat source, commonly an electric resistance heater. When EMERGENCY HEAT 80 is selected, the heat pump is disabled and the auxiliary heat source is the sole source of heat. This manual override remains active until removed by once again pressing EMERGENCY HEAT 80.

HEAT 82 is displayed when the system is in heating mode. When in a cooling mode, the word HEAT is replaced by the word COOL. FRESH AIR 84 is pressed when the heater/cooler 86 of system 58 has a fresh air baffle 88 to permit outside air 90 to be used instead of inside air 92. This feature is described in more detail below with reference to FIGS. 4, 5 and 7.

Figure 4:
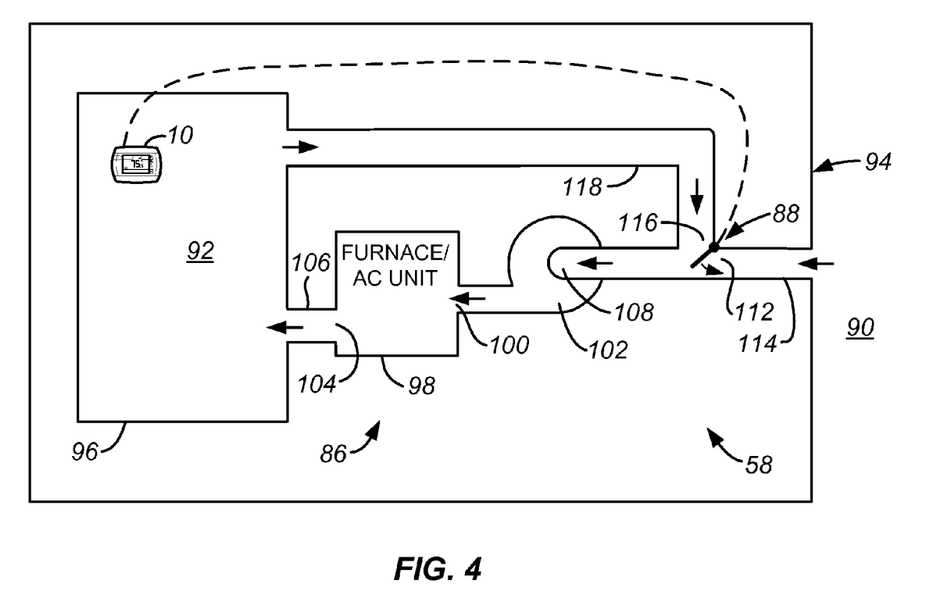
FIG. 4 is a simplified schematic of a heating/cooling systems including the thermostat of FIG. 1 coupled to a heater/cooler.
Figure 5:
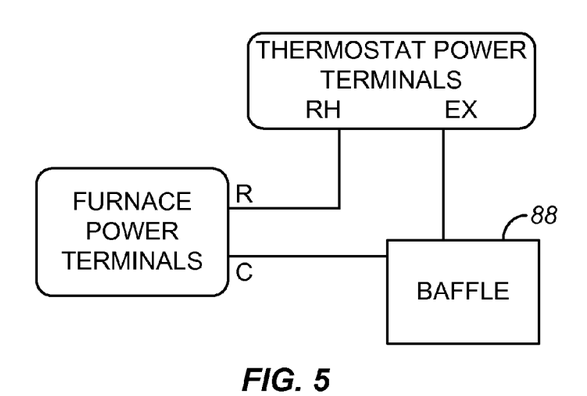
FIG. 5 illustrates exemplary terminal connections among the thermostat, baffle and furnace/AC unit of FIG. 4.

FIG. 4 illustrates heating cooling system 58 within a building 94 or other structure having a temperature-controlled region 96. In FIG. 4 heater/cooler 86 is shown within building 94 but generally outside of temperature-controlled region 96. Heater/cooler 86 could also be located wholly or partially in one or more of the outside of building 94, inside of temperature-controlled region 96, or inside a building 94 but outside of temperature-controlled region 96. Heater/cooler 86, in this example, includes a combined furnace/air-conditioning (AC) unit 98, an air inlet 100 connected to a blower or fan 102, and an air outlet 104 connected to conditioned air inlet ducts 106. Air inlet ducts 106 deliver conditioned air to temperature-controlled region 96. Fan 102 has an air inlet 108 connected to the outlet 110 of fresh air baffle 88. Fresh air baffle 88 has a fresh air inlet 112 connected to outside air 90 through a fresh air duct 114. Fresh air baffle 88 has a return air inlet 116 connected to temperature-controlled region 96 by return ducting 118. As shown in FIG. 5, fresh air baffle 88 is connected to and controlled by thermostat 10 with power provided by furnace power terminals 120. Other configurations for powering and control of fresh air baffle 88 can also be used. For example, fresh air baffle 88 could be powered by a battery or by a rechargeable battery connected to a small power generating turbine placed just upstream of air inlet 108 of fan 102. Also, fresh air baffle could be controlled by thermostat 10 using wireless technology.

The display and selection of the various fan functions are initiated from home screen 24 of FIG. 1 by first pressing on power/mode input 23 and then pressing on fan icon 126. Pressing on fan icon 126 causes the fan functions (in this example, AUTO, CIRC (CIRCULATE), ON, and FRESH) to be displayed; one or more of the fan functions can be selected by pressing on the displayed fan function. The one or more fan functions which have been selected are highlighted. AUTO indicates that fan 102 operates automatically with the operation of furnace/AC unit 98. CIRC indicates that fan 102 operates automatically to circulate air for up to nine minutes per hour to improve air quality and efficiency. ON indicates that fan 102 operates continuously whether or not furnace/AC unit 98 is operating, that is heating or cooling the air. FRESH indicates that the fresh air baffle 88 is open so that both outside air 90 and inside air 92 can be driven into conditioned region 96 by fan 102. In one example, the following different fan functions or groups of fan functions can be selected. First, ON; second, ON plus FRESH; third, AUTO; fourth, AUTO plus FRESH; fifth, AUTO plus CIRCULATE; sixth, AUTO plus CIRCULATE plus FRESH.

Figure 6:
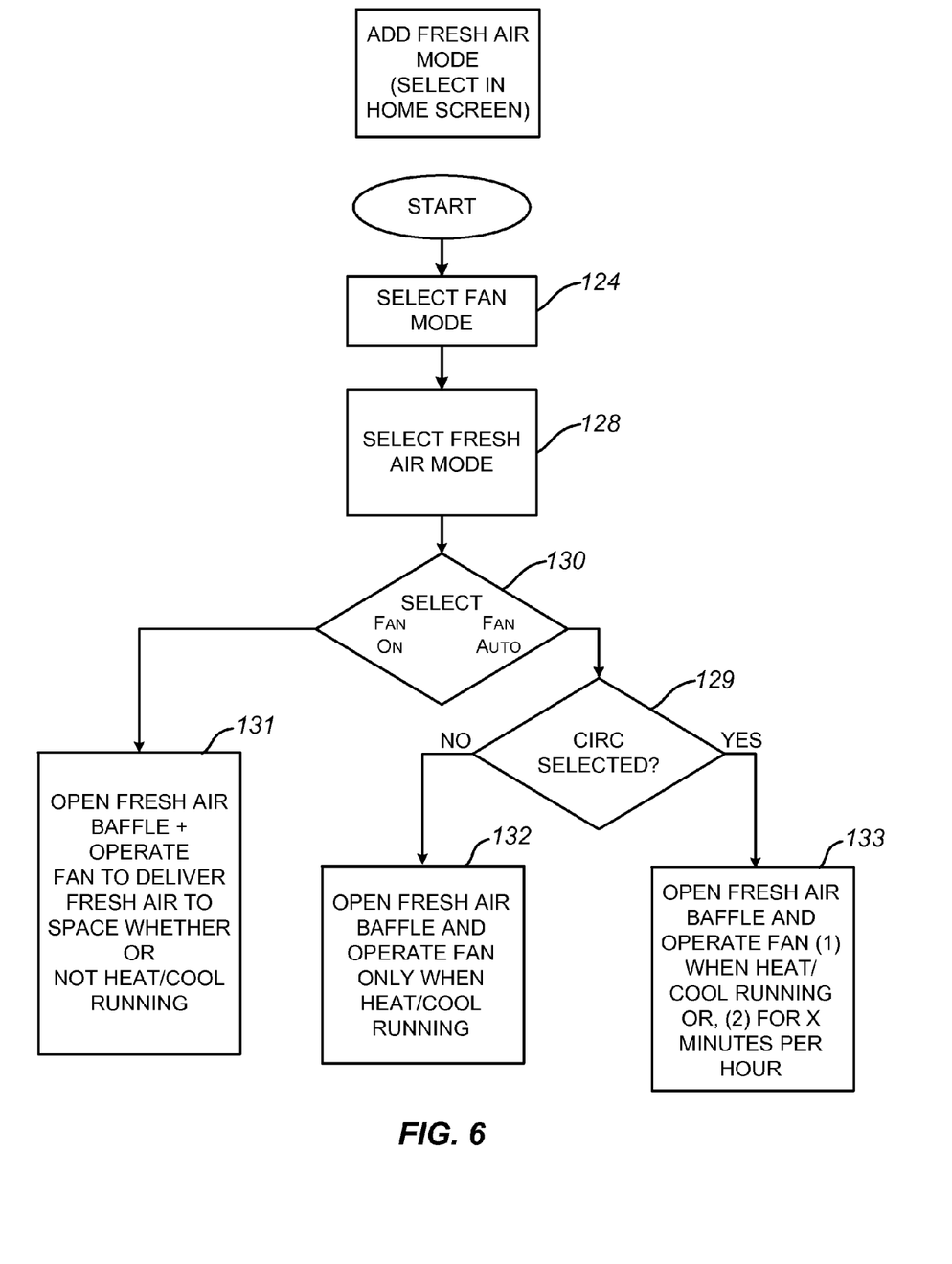
FIG. 6 is a flowchart showing the operation of the heating/cooling system of FIG. 4 in an Add Fresh Air mode.

Two different fresh air procedures will now be discussed. The first procedure, outlined in FIG. 6, is initiated from home screen 24 of FIG. 1 by pressing on power/mode input 23 to select the fan mode at 124. To select the fresh air mode at 128, fan icon 126 is pressed and then FRESH is selected by touching it. The fresh air mode is used when it is desired to operate fresh air baffle 88 so that fan 102 pulls outside air 90 into furnace/AC unit 98 and then into region 96. The user is then given the option at select 130 to select either FAN ON or FAN AUTO.

If FAN ON is selected, fresh air baffle 88 is actuated open at 131 as shown in FIG. 4. This causes the fan 102 to draw outside air 90 through fresh air duct 114 and into the air inlet 108 of the fan and mix with the inside air 92 drawn through return air inlet 116. Fan 102 will run, and therefore draw both inside air 92 and outside air 90 through the heater/cooler 86 and into conditioned region 96, whether or not heater/cooler 86 is running, that is heating or cooling the air passing through it.

If FAN AUTO is selected when the fresh air mode is active, and if CIRC has not been selected as indicated at 129, fan 102 will run, as indicated at 132, and therefore draw outside air 90 through fresh air duct 114, draw inside air 92 through return ducting 118 and force the mixture of both into air inlet 108 of the fan, through the heater/cooler 86 and into conditioned region 96; this occurs only with the operation of heater/cooler 86, that is when heater/cooler 86 is heating or cooling the air passing through it. When heat or cool shuts off, fan 102 turns off and baffle 88 closes to seal off fresh air inlet 112.

If FAN AUTO is selected when the fresh air mode is active, and if CIRC has been selected as indicated at 129, fan 102 will run, as indicated at 133, and therefore draw outside air 90 and inside air 92 through the heater/cooler 86 and into conditioned region 96, (1) with the operation of heater/cooler 86, that is when heater/cooler 86 is heating or cooling the air passing through it, and (2) for at least a minimum length of time per time period, such as 5-9 minutes per hour. When fan 102 is running, fresh air baffle 88 is actuated at 133. When fan 102 is not running, baffle 88 closes to seal off fresh air inlet 112. In some examples, fresh air baffle 88 can be designed to seal off the return air inlet 116 some or all of the time fresh air 90 is being drawn into region 96 by fan 102; in such cases instead of modifying fresh air baffle 88 so that it can be used to seal off return air inlet 116, an additional baffle can be used along return ducting 118.

Figure 7:
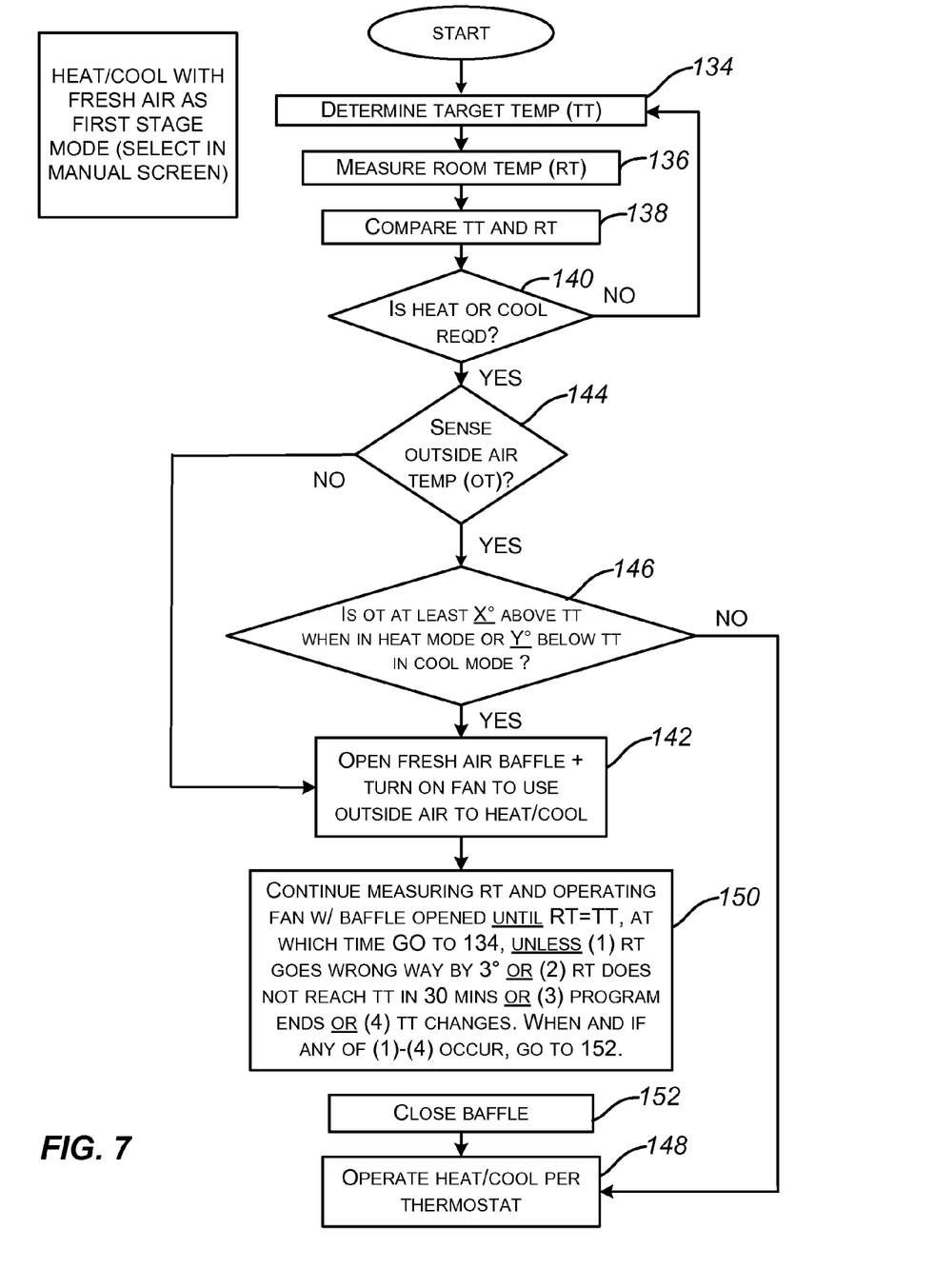
FIG. 7 is a flowchart showing the operation of the heating/cooling system of FIG. 4 in a Fresh Air As First Stage mode.

The second procedure is outlined in FIG. 7. Generally speaking, this procedure causes heating/cooling system 58 to use outside air 90 as the first stage of a heating or cooling program when the temperature of the outside air is appropriate. This procedure is initiated with the mode in either of the heat or cool modes. This second procedure will be discussed assuming thermostat 10 is in the heat mode indicated by HEAT 82 in FIG. 3. The procedure works similarly when in the COOL mode. Fresh air 84 on manual screen 70 is then pressed to initiate the second fresh air procedure of FIG. 7. Thermostat 10 then determines the programmed or otherwise selected target temperature (TT) at 134, measures the temperature within temperature-controlled region 96, typically referred to as the room temperature, at 136 and then compares the target temperature and the room temperature at 138 to obtain a difference between the temperatures called the Initial Temperature Difference. A decision is made at 140 based upon on the Initial Temperature Difference. For example, assume system 58 in a heating mode, the temperature swing is 1° F. and the target temperature is 70° F. If the measured room temperature is at least 69° F. then there would be no need for additional heat. When heating or cooling is not required, control is returned to 134.

If there is an outside temperature sensor present and if heating or cooling is required, thermostat 10, in this example, senses the outside air temperature at 144.

If the answer at 146 is yes, so that outside temperature is at least X° above the target temperature when in a heating mode or at least Y° below the target temperature when in a cooling mode as indicated at 146, then control passes to 142. At 142 thermostat 10 provides an appropriate signal to open fresh air baffle 88 to connect fresh air ducting 114 to air inlet 108 of fan 102, and turn on fan 102 causing outside air 90 to be driven into region 96 of the building 94 to heat or cool region 96 with outside air 90. Typically X and Y are each about 2° F. or more.

Following 142, system 58 continues to operate with fresh air baffle 88 open as indicated at 150. During the operation, the room temperature is at least periodically measured to obtain Updated Room Temperature measurements. System 58 continues to operate until the room temperature equals the target temperature, at which time control is returned to 134. However, if one of the following four events occurs, control is passed to 152 causing baffle 88 to close, thereby sealing off fresh air inlet 112. First, control is passed to 152 when the Updated Room Temperature differs from the initial room temperature by more than, in one example, 3° F. in the wrong direction (moving colder or down when heating and warmer or up when cooling). Second, control is passed to 152 if the Updated Room Temperature does not reach the target temperature within a length of time, such as 30 minutes. Third, control is passed to 152 if the current program segment of thermostat 10 ends and next program segment starts. Fourth, control is passed to 152 if the target temperature changes. This is followed by 148 at which heating/cooling system 58 operates according to the current program segment of thermostat 10.

If there is an external temperature sensor and the answer at 146 is no, so that outside temperature is not at least X° above the target temperature when in a heating mode or is not at least Y° below the target temperature when in a cooling mode as indicated at 146, then control passes to 148. At 148 heating/cooling system 58 operate according to the current program segment of thermostat 10 with fresh air baffle 88 closed.

In other examples, the outside air temperature sensing steps 144 and 146 are omitted as indicated by the no answer at 144. In such examples, if heating or cooling is required as in 140, control passes directly to 142 at which thermostat 10 provides an appropriate signal to open fresh air baffle 88 to connect fresh air ducting to air inlet 108 of fan 102, and turn on fan 102 causing outside air 90 from fresh air ducting 114 and inside air 92 from return ducting 118 to be driven into region 96 of the building 94 to heat or cool region 96 with outside air 90.

Other modification and variation can be made to the disclosed embodiments without departing from the subject of the invention as defined in following claims.

Any and all patents, patent applications, and printed publications referred to above are incorporated by reference.

What is claimed is:

1. A method for operating a heater/cooler controlled by a thermostat, the heater/cooler operable to condition air in a temperature-controlled region, said temperature-controlled region being within an ambient environment of outside air, the method comprising:

obtaining a target temperature;

measuring the temperature of a temperature-controlled region, called the measured temperature, by a thermostat with the thermostat operating according to a program segment;

comparing the target temperature and the measured temperature to obtain an Initial Temperature Difference between said temperatures;

determining if heating/cooling is required based upon said Initial Temperature Difference; and if heating/cooling is required:

directing outside air from the ambient environment into the temperature-controlled region without using the heater/cooler to change the temperature of the outside air;

at least periodically measuring the temperature of the temperature-controlled region to obtain an updated measured temperature; and continuing the directing and measuring steps until (1) the measured temperature equals the target temperature, at which time return to the obtaining a target temperature step, or (2) the updated measured temperature differs from the target temperature by a chosen amount, at which time stop directing outside air into the temperature-controlled region and operate the heater/cooler under control of the thermostat.

2. The method according to claim 1, wherein a furnace constitutes the heater/cooler.

3. The method according to claim 1, wherein the heater/cooler comprises a furnace and an air-conditioning unit.

4. The method according to claim 1, wherein the continuing the directing and measuring steps comprises:
   continuing the directing and measuring steps until (1) the measured temperature equals the target temperature, at which time return to the obtaining a target temperature step, or (2) any one of the following occurs, at which time stop directing outside air into the temperature-controlled region and operate the heater/cooler under control of the thermostat:
   the updated measured temperature differs from the target temperature by a chosen amount; or
   the updated temperature does not reach the target temperature within a chosen length of time.

5. The method according to claim 1, wherein the continuing the directing and measuring steps comprises:
   continuing the directing and measuring steps until (1) the measured temperature equals the target temperature, at which time return to the obtaining a target temperature step, or (2) any one of the following occurs, at which time stop directing outside air into the temperature-controlled region and operate the heater/cooler under control of the thermostat:
   the updated measured temperature differs from the target temperature by a chosen amount; or
   the updated temperature does not reach the target temperature within a chosen length of time; or
   the target temperature changes.

6. The method according to claim 1, wherein the continuing the directing and measuring steps comprises:
   continuing the directing and measuring steps until (1) the measured temperature equals the target temperature, at which time return to the obtaining a target temperature step, or (2) any one of the following occurs, at which time stop directing outside air into the temperature-controlled region and operate the heater/cooler under control of the thermostat:
   the updated measured temperature differs from the target temperature by a chosen amount; or
   the updated temperature does not reach the target temperature within a chosen length of time; or
   the target temperature changes; or
   the program segment ends.

7. The method according to claim 1, wherein if heating/cooling is required, then further comprising the following before the direct outside air step:
   sensing the temperature of the outside air;
   if the temperature of the outside air is at least X° above the target temperature when in a heating mode or is at least Y° below the target temperature in the cooling mode, then proceed with the direct outside air step; and
   if the temperature of the outside air is not at least X° above the target temperature when in a heating mode or is not at least Y° below the target temperature in the cooling mode, then operate the heater/cooler under control of the thermostat.

8. The method according to claim 7, wherein X and Y are each at least 2° F.

9. A method for operating a heater/cooler controlled by a thermostat, the heater/cooler operable to condition air within a temperature-controlled region, said temperature-controlled region being within an ambient environment of outside air, the method comprising:
   selecting between a fan on mode and a fan auto mode;
   selecting or not selecting a circulate mode;
   if the fan on mode is selected, then direct outside air from the ambient environment into the temperature-controlled region whether or not the heater/cooler is operating to change the temperature of the air within the temperature-controlled region;
   if the fan auto mode is selected and the circulate mode is not selected, then direct outside air from the ambient environment into the temperature-controlled region when the heater/cooler is operating to change the temperature of the air within the temperature-controlled region; and
   if the fan auto mode is selected and the circulate mode is selected, then direct outside air from the ambient environment into the temperature-controlled region: (1) when the heater/cooler is operating to change the temperature of the air within a temperature-controlled region, and (2) for a minimum length of time per time period.

10. The method according to claim 9, wherein the minimal length of time per time period is about 5-9 minutes per hour.

11. A method for operating a heater/cooler controlled by a thermostat, the heater/cooler operable to condition air in a temperature-controlled region, said temperature-controlled region being within an ambient environment of outside air, the method comprising:
   choosing to operate in either a fan fresh air mode or a fresh air first stage mode;
   if the fan fresh air mode is selected, then:
     select between a fan fresh air on mode and a fan fresh air auto mode;
     if the fan fresh air on mode is selected, then direct outside air from the ambient environment into the temperature-controlled region whether or not the heater/cooler is operating to change the temperature of the air within the temperature-controlled region; and
     if the fan fresh air auto mode is selected, then direct outside air from the ambient environment into the temperature-controlled region only when the heater/cooler is operating to change the temperature of the air within a temperature-controlled region;
   if the fresh air first stage mode is chosen, then:
     obtain a target temperature;
     measure the temperature of a temperature-controlled region, called the measured temperature, by a thermostat operating according to a program segment;
     compare the target temperature and the measured temperature to obtain an initial temperature difference between said temperatures;
     determine if heating/cooling is required based upon said initial temperature difference;
     if heating/cooling is required:
       direct outside air from the ambient environment into the temperature-controlled region without using the heater/cooler to change the temperature of the outside air;
       at least periodically measure the temperature of the temperature-controlled region to obtain an updated measured temperature; and continuing the directing and measuring steps until (1) the measured temperature equals the target temperature, at which time return to the obtaining a target temperature step, or (2) the updated measured temperature differs from the target temperature by a chosen amount, at which time stop directing outside air into the temperature-controlled region and operate the heater/cooler under control of the thermostat.

12. The method according to claim 11, wherein if it is determined that heating/cooling is required, then further comprising the following before the direct outside air step:

sensing the temperature of the outside air;
if the temperature of the outside air is at least X° above the target temperature when in a heating mode or at least Y° below the target temperature in the cooling mode, then proceed with the direct outside air step; and
if the temperature of the outside air is not at least X° above the target temperature when in a heating mode or is not at least Y° below the target temperature in the cooling mode, then operate the heater/cooler under control of the thermostat.

13. The method according to claim 12, wherein the continuing the directing and measuring steps comprises:

continuing the directing and measuring steps until (1) the measured temperature equals the target temperature, at which time return to the obtaining a target temperature step, or (2) any one of the following occurs, at which time stop directing outside air into the temperature-controlled region and operate the heater/cooler under control of the thermostat:

the updated measured temperature differs from the target temperature by a chosen amount; or
the updated temperature does not reach the target temperature within a chosen length of time; or
the target temperature changes; or
the program segment ends.

* * * * *